US006595418B1

(12) United States Patent
Igarashi et al.

(10) Patent No.: US 6,595,418 B1
(45) Date of Patent: Jul. 22, 2003

(54) ENHANCED ARTICLE MANAGEMENT SYSTEM AND METHOD

(75) Inventors: Keisuke Igarashi, Tokyo (JP); Kazuo Akaike, Tokyo (JP); Yuzo Miura, Yamanashi (JP); Hideki Aridome, Tokyo (JP); Yukio Otani, Yamanashi (JP); Toshio Ogawa, Kanagawa (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 160 days.

(21) Appl. No.: 09/663,849

(22) Filed: Sep. 18, 2000

(30) Foreign Application Priority Data

| Sep. 28, 1999 | (JP) | 11-273807 |
| Sep. 28, 1999 | (JP) | 11-273808 |
| Sep. 28, 1999 | (JP) | 11-273809 |
| Sep. 29, 1999 | (JP) | 11-276786 |

(51) Int. Cl.⁷ ............................................. G06K 5/00
(52) U.S. Cl. .................................. 235/385; 235/449
(58) Field of Search ........................ 235/385, 435, 235/443, 449, 450, 462.01, 462.13, 462.46, 472.02, 492

(56) References Cited

U.S. PATENT DOCUMENTS

| 5,852,289 A | * | 12/1998 | Masahiko | 235/492 |
| 5,912,622 A | * | 6/1999 | Endo et al. | 340/572.5 |
| 6,204,764 B1 | * | 3/2001 | Maloney | 235/385 |
| 6,232,870 B1 | * | 5/2001 | Garber et al. | 235/385 |
| 6,285,284 B1 | * | 9/2001 | Soe et al. | 340/572.1 |
| 6,332,544 B1 | * | 12/2001 | Mitani | 235/375 |
| 6,335,686 B1 | * | 1/2002 | Goff et al. | 343/895 |

FOREIGN PATENT DOCUMENTS

| JP | 6-83842 | 3/1994 |
| JP | 10-307871 | 11/1998 |
| JP | 10-334198 | 12/1998 |
| JP | 11-79328 | 3/1999 |
| JP | 225921 | * 8/2001 | G06K/17/00 |

* cited by examiner

Primary Examiner—Daniel St. Cyr
(74) Attorney, Agent, or Firm—Knoble & Yoshida, LLC

(57) ABSTRACT

An article management system generally includes an exit monitoring device, a storage shelf unit and a non-contact id tag. Each of these components are optionally equipped with a detection enhancing device for enhancing the transmission and or reception of signals between the non-contact id tag and the exit monitoring device or between the non-contact id tag and the storage shelf unit. The detection enhancing device includes a loop conductive line or an additional loop antenna.

30 Claims, 16 Drawing Sheets

MAGNETIC FIELD DIRECTION

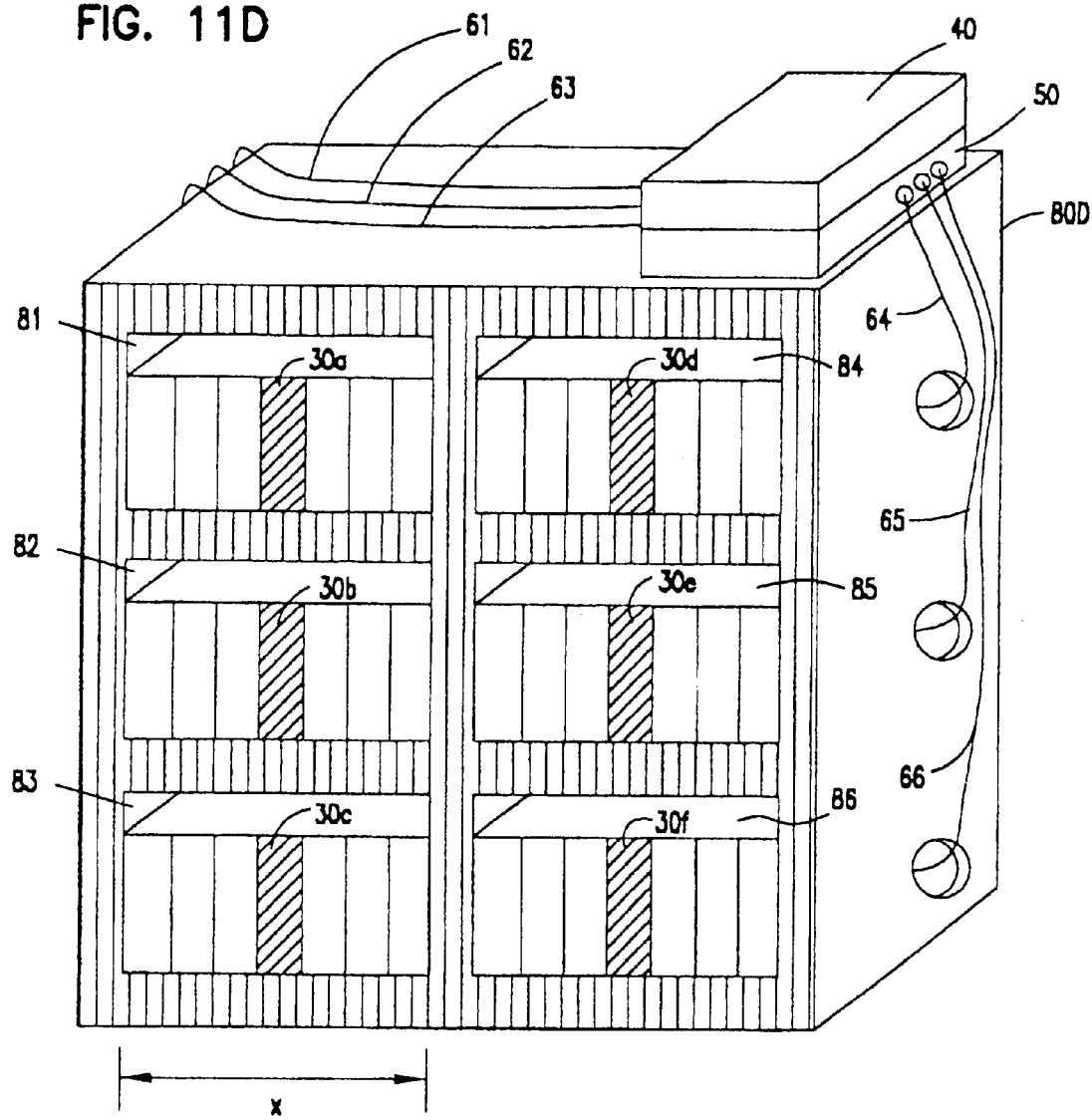

FIG. 15A

BOOK INFO. FILE 101

| BOOK I.D. | BOOK TITLE | PUBLISHER | BORROWING MEMBER I.D. | CHECK-OUT DATE | RETURN DUE DATE | ACTUAL RETURNED DATE | ..... |
|---|---|---|---|---|---|---|---|
| 12345 | A STORY | XY PUBLISHER | 333 | 8/8/00 | 8/22/00 | | |
| | | | | | | | |
| | | | | | | | |

FIG. 15B

MEMBER INFO. FILE 102

| MEMBER I.D. | NAME | ADDRESS | PHONE | DRIVER LICENSE I.D. | CURRENTLY BORROWING BOOK TITLES | ..... |
|---|---|---|---|---|---|---|
| 333 | JOHN SMITH | HOMETOWN, PA. | 610-123-4567 | 12345 | A STORY | |
| | | | | | | |
| | | | | | | |

FIG. 15C

INVENTORY INFO. FILE 103

| STOCK I.D. | BOOK I.D. | BOOK TITLE | BORROWING MEMBER I.D. | DUE DATE | MIS-STACKED | LOST | ..... |
|---|---|---|---|---|---|---|---|
| A-1 | 12345 | A STORY | 333 | 8/22/00 | 0 | 0 | |
| : | : | | | | | | |
| A-2 | | | | | | | |
| : | | | | | | | |

ENHANCED ARTICLE MANAGEMENT SYSTEM AND METHOD

FIELD OF THE INVENTION

The current invention is generally related to inventory and management of articles or items, and more particularly related to enhanced detection of the article placement at predetermined positions in a predetermined area as well as prevention of the removal of these articles from the predetermined area.

BACKGROUND OF THE INVENTION

IC cards used as a non-contact identification tag have been used in combination with a reader-writer for managing articles. For example, IC cards have been used in transportation systems as well as goods distribution systems with a frequency band of 13.56 MHz. The reader-writer is equipped with an antenna which periodically transmits power as well as question data and receives a response signal from the IC cards that are located within a reception range of the above transmission.

Another prior art example of the article managing system is library management systems. As shown in FIG. 1, one exemplary library management system utilizes a bar code identification tag 12 on library books 10. Each bar code encodes information on book identification, a title, classification/category, author and so on. FIG. 2 shows a membership card 14 used in conjunction with the above book identification bar code 12 of FIG. 1. A membership bar code 16 includes information on a name of the member, address, a telephone number, a driver license number and so on. Both of the bar codes 12 and 16 are read by a bar code reader when a member checks out a book to generate a borrowing record in a central computer. The borrowing record includes the book identification, the title, the publisher, the member identification, a check-out date, a return due date and a returned date. When the book is returned, the bar code on the returned book is read again to write the actual returned date in the borrowing record.

In stead of using the bar codes, Japanese Patent Publication Hei 11-79328 discloses the use of IC cards in a library management system. An IC card is placed on each book, and each IC card holds information to identify the books. The IC card does not contain any battery, but the information can be read and written by a reader-writer. A bottom surface of a shelf is equipped with a coil or antenna of the reader-writer. The coil or antennas include a pair of a transmission coil and a reception coil that are alternately wound on a flat line. When a book is inserted into the shelf over the flat coil antenna, the information stored in the IC card is detected by the reader-writer via the antenna. Although the coil antennas are redundantly placed in parallel or a predetermined geometry on a shelf surface, the communication between the IC card and the reader-writer partially depends upon a relative angle of the book with respect to the antenna coil. More precisely, since the magnetic field directions of the IC card and the antenna coils are not often perpendicular with each other upon insertion of the book into the self, the communication is not optimal.

The communication between the IC card and the reader-writer remains to be improved. As shown in FIG. 3, when books 10A and 10B respectively with the IC card tags 90A and 90B is near an exit detection device 140, the detection is accomplished with sufficiency with a certain predetermined relative directionality. The IC card 90A is placed in the back of the book 10A while the IC card 90B is placed on a front cover of the book 10B. In order for the book 10A to be sufficiently detected, the book 10A must be placed perpendicular to the exit gate 140 so that the magnetic field direction of the IC card tag 90A as indicated by a double headed arrow is also perpendicular. On the other hand, in order for the book 10B to be sufficiently detected, the front cover 10B of the book 10B has to face the exit detection device 140 as shown in FIG. 3 so that the magnetic field direction of the IC card tag 90B as indicated by a double headed arrow is also perpendicular.

SUMMARY OF THE INVENTION

In order to solve the above and other problems, according to a first aspect of the current invention, a method of keeping track of a plurality of articles in a predetermined area, including: placing a non-contact id tag on one surface of each of the articles to be monitored, the non-contact id tag containing information; placing a sensing portion of a non-contact id tag reader-writer at a predetermined location within the predetermined area; placing a non-contact id tag detection enhancing device so as to increase detection of the non-contact id tag by the non-contact id reader-writer; and detecting the non-contact id tag near the non-contact id reader-writer in the predetermined area.

According to a second aspect of the current invention, a system for keeping track of a plurality of articles in a predetermined area, including: a non-contact id tag placed on one surface of each of the articles to be monitored, the non-contact id tag containing information; a non-contact id tag reader-writer located near the predetermined area, the non-contact reader-writer having a sensing portion for detecting the non-contact id tag placed near the non-contact id reader-writer; and a non-contact id tag detection enhancing device also placed near the non-contact id reader-writer so as to increase the detection of the non-contact id tag by the non-contact id reader-writer.

According to a third aspect of the current invention, a non-contact id tag module, including: an IC card tag having a memory unit for storing information, a control unit connected to the memory unit for reading and writing the information, a resonance circuit for resonating a signal, a power generating unit connected to the resonance circuit for generating power from the signal, and a data demodulation unit and a data modulation unit for connected to the control unit for respectively modulating and demodulating the information to generate the signal; and a loop conductive line for enhancing reception and transmission of the signal.

According to a fourth aspect of the current invention, a storage shelf unit for detecting a non-contact id tag on articles, including: a plurality of shelves; a plurality of movable loop antennas placed on the shelves for transmitting signals to and receiving signals from the non-contact id tag; an antenna switcher connected to the movable loop antennas for switching from one of the movable loop antennas to another one of the movable loop antennas; a data modulator/demodulator connected to the antenna switcher for modulating and demodulating the signals; a processing unit connected to the data modulator/demodulator for processing the signals; and a communication interface connected to the processing unit for providing an interface in transmitting the processed signals and in receiving other signals from an outside unit.

According to a fifth aspect of the current invention, an exit monitor device for detecting a non-contact id tag on articles, including: a plurality of pairs of loop antennas placed near an exit for transmitting signals to and receiving signals from the non-contact id tag, each of the pairs of the loop antennas having magnetic field directions that are perpendicular to each other; an antenna switcher connected to the loop antennas for switching from one of the pairs of the loop antennas to another one of the pairs of the loop antennas; a data modulator/demodulator connected to the antenna switcher for modulating and demodulating the signals; a processing unit connected to the data modulator/demodulator for processing the signals; and communication interface connected to the processing unit for providing an interface in transmitting the processed signals and in receiving other signals from an outside unit.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 15 illustrates information store in the memory unit of the central processing unit as shown in FIG. 14.

DETAILED DESCRIPTION OF THE PREFERRED EMBODIMENT(S)

Figure 4A:
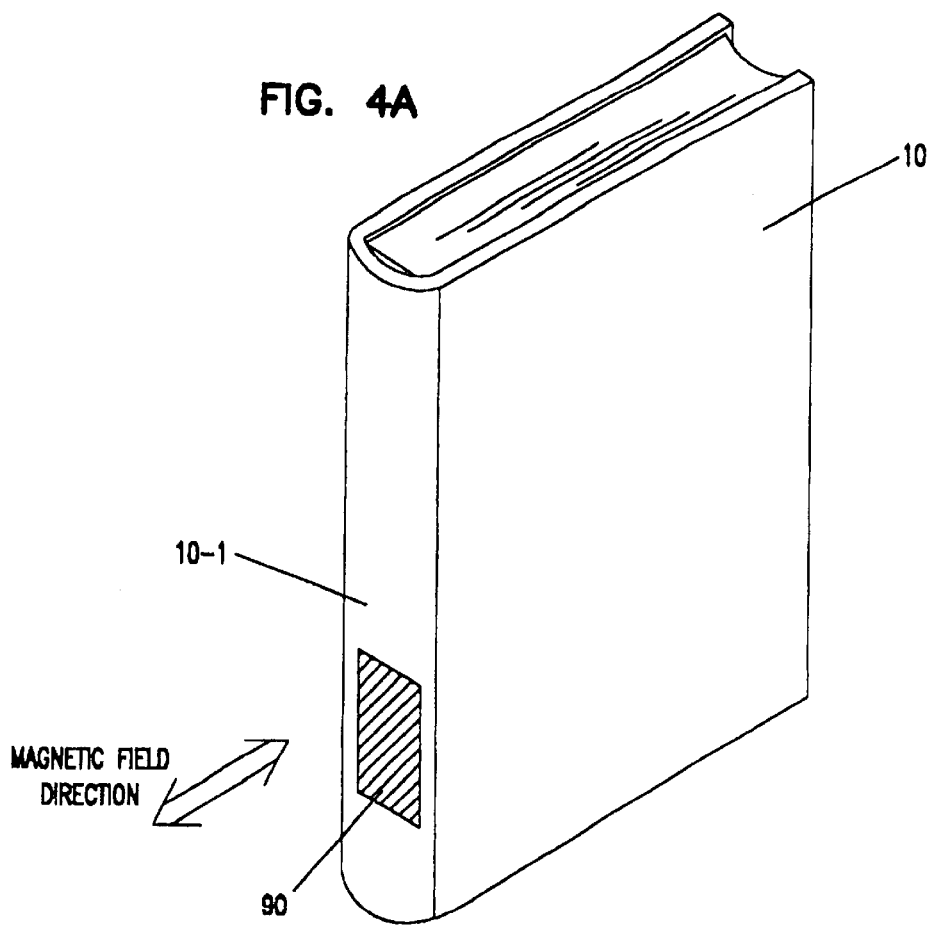
FIGS. 4A and 4B illustrate one preferred embodiment of the IC card assembly according to the current invention.
Figure 4B:
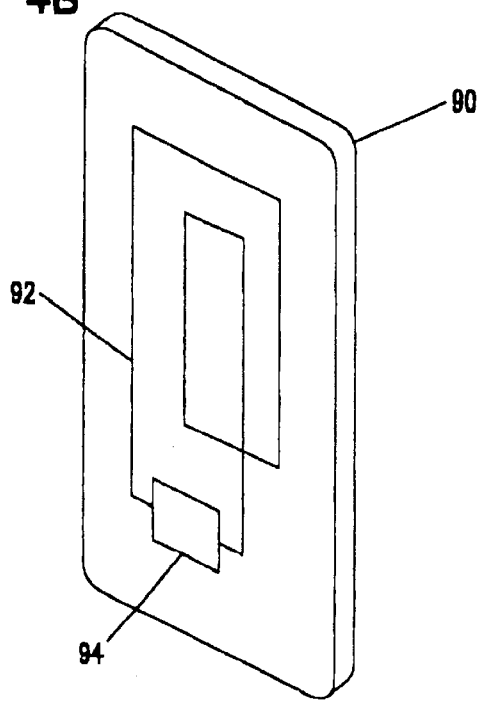
Figure 4C:
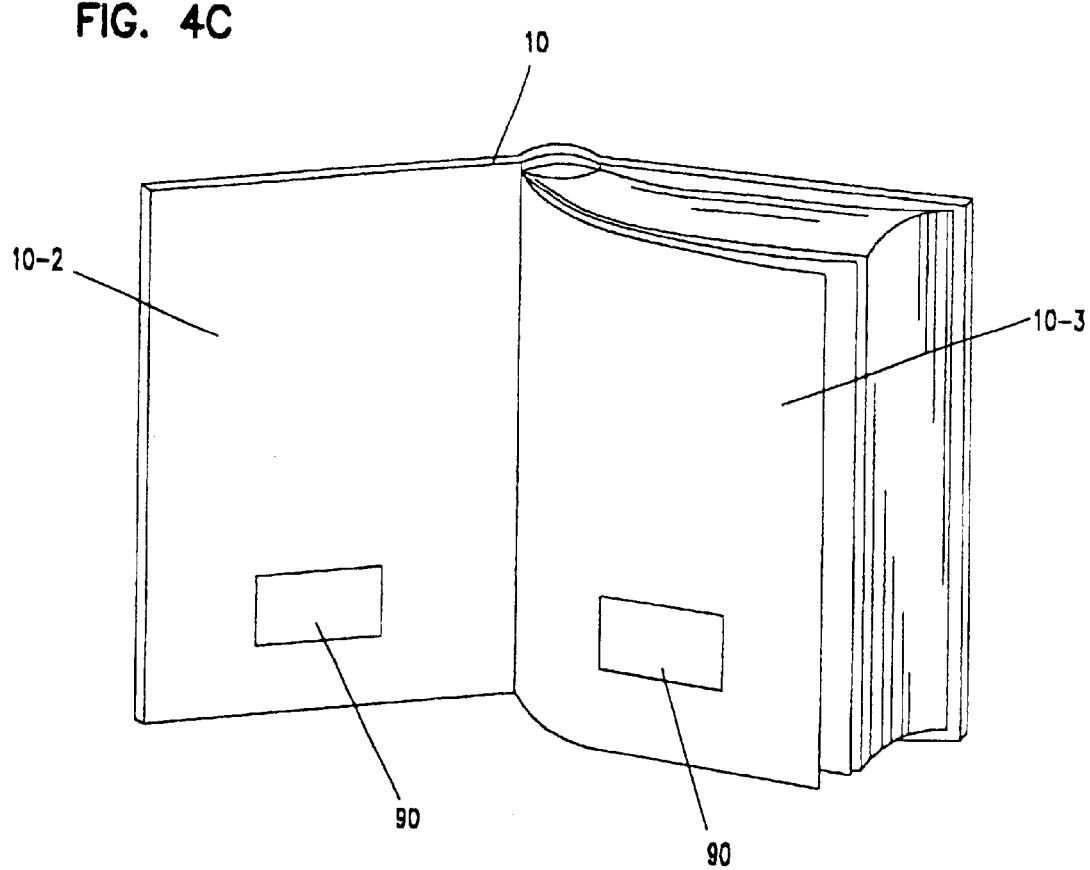

Referring now to the drawings, wherein like reference numerals designate corresponding structures throughout the views, and referring in particular to FIG. 4B, one preferred embodiment of the IC card assembly 90 according to the current invention includes an IC card 94 and a loop antenna or a conductive line 92 connected to the IC card 94. The IC card 94 is placed in a housing that is about 0.5 mm in thickness. Now referring to FIG. 4A, the IC card assembly B is placed on a back 10-1 of a book 10. As a result of placement of the IC card assembly 90 on the book 10-1, the loop antenna 92 has magnetic field direction as indicated by a double-headed arrow. FIG. 4C shows that the IC card assembly is placed at a different location in the book 10 such as an inner front cover 10-2 or a first page 10-3 of the book 10. The IC card assembly 90 is a non-contact ID tag device to be detected by a reader-writer without physically contacting the reader-writer.

Figure 1:
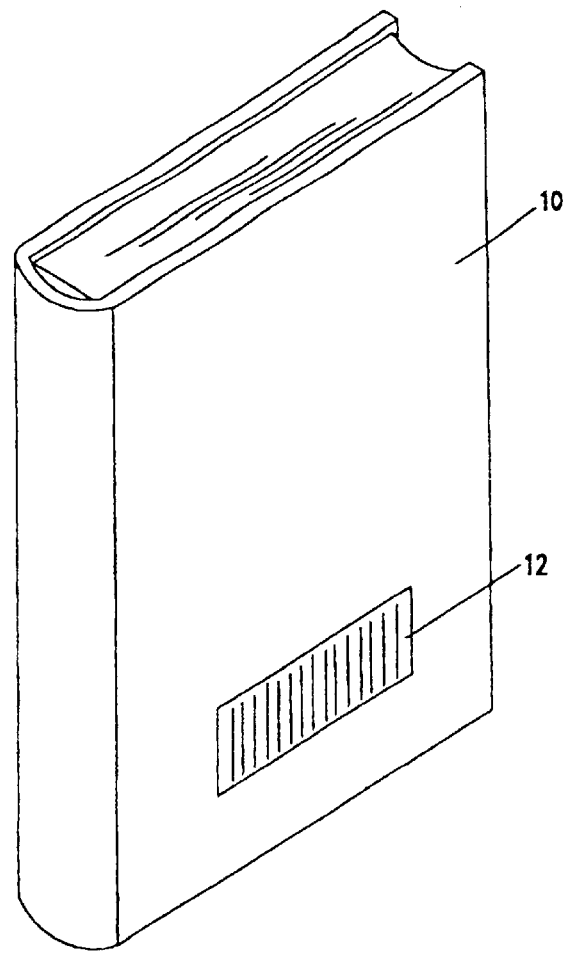
FIG. 1 is one exemplary library management system that utilizes a bar code identification tag on library books.
Figure 2:
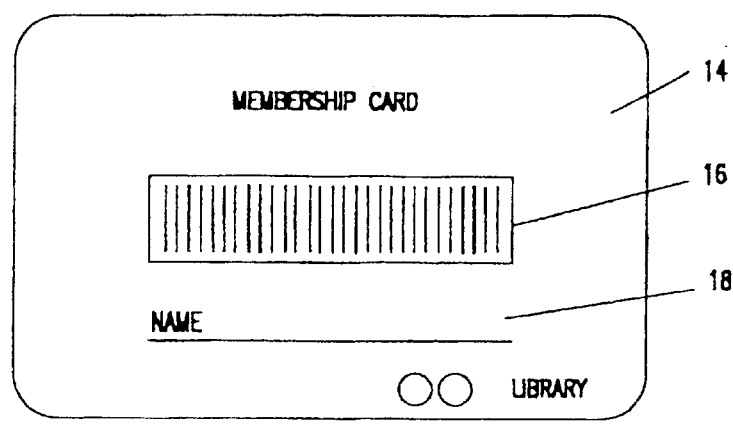
FIG. 2 shows a membership card used in conjunction with the above book identification bar code.
Figure 3:
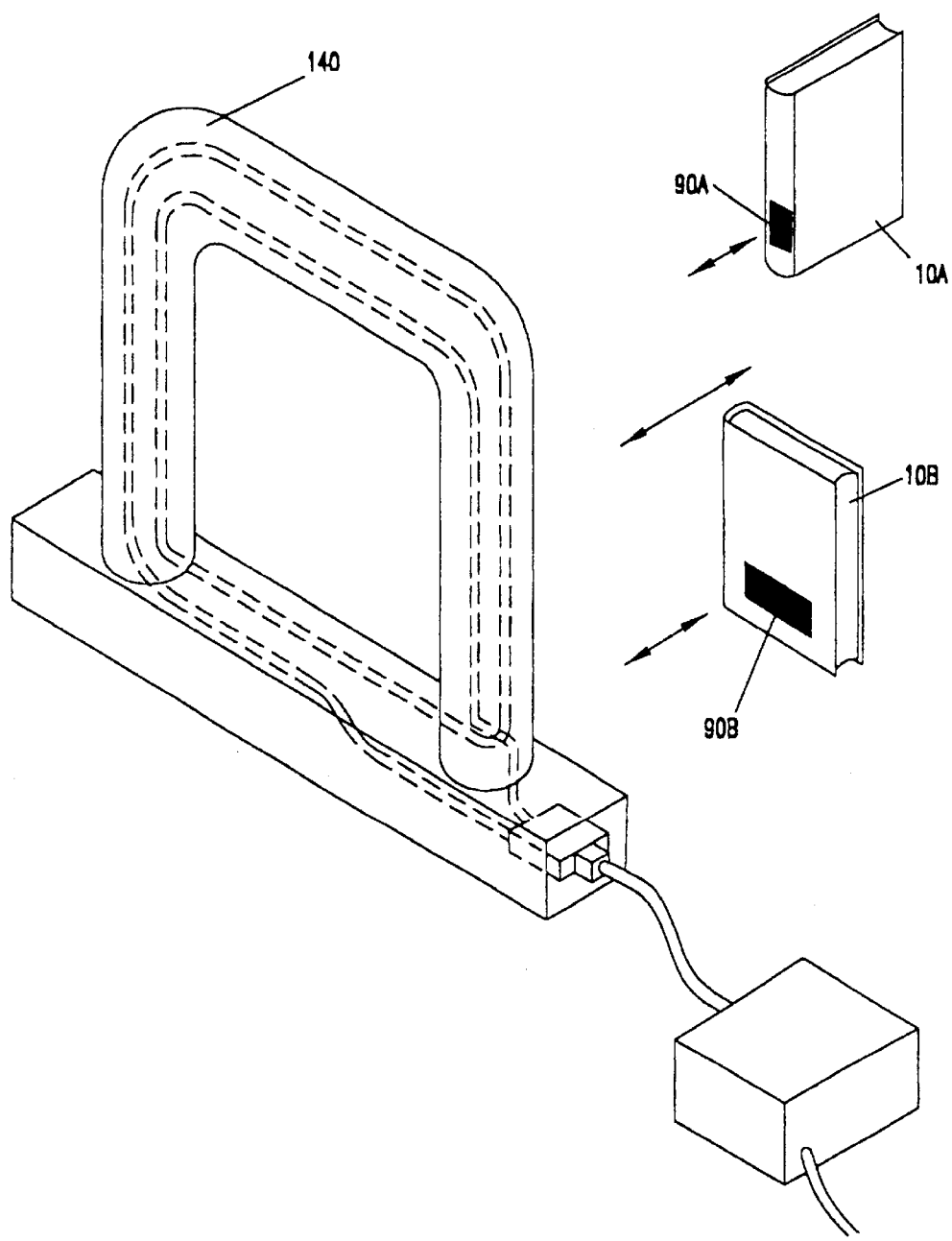
FIG. 3 shows exemplary relative directions of a detection device and an IC card tag.
Figure 5:
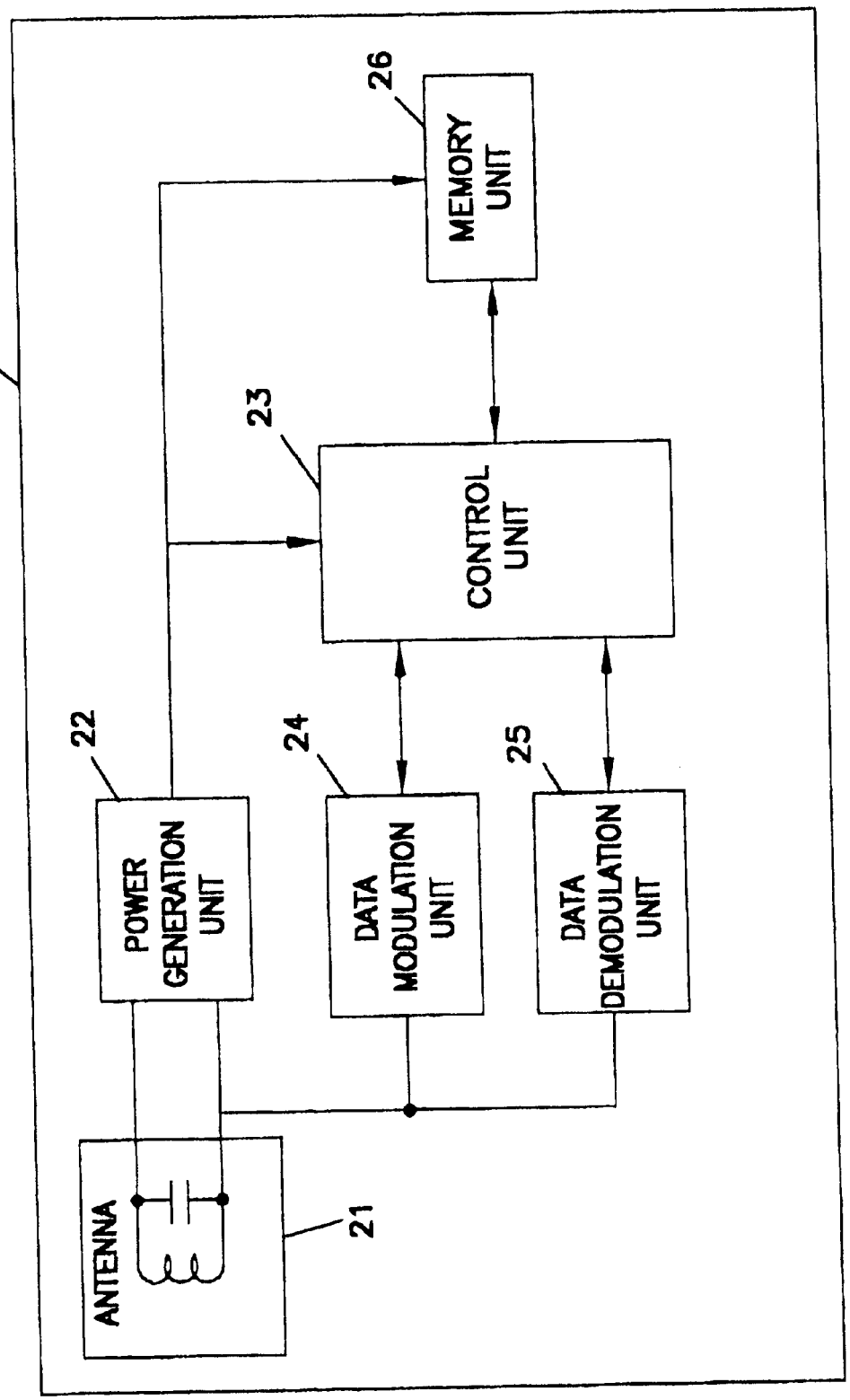
FIG. 5 is a block diagram illustrating components of the IC card according the current invention.

Referring to FIG. 5, the IC card 94 of the preferred embodiment according to the current invention includes a coil 21 for transmitting and receiving a signal, a power generation unit 22 for generating power from the received signal, a data modulation unit 24 for modulating data in the signal to be transmitted; a data demodulation unit 25 for demodulating data in the received signal; a memory unit 26 for storing information/data and a control unit for controlling access to and from the memory 26 as well as the modulation and demodulation units 24, 25. The coil 21 essentially works as an antenna, but has only one directionality. The loop antenna 92 as shown in FIG. 3B increases the sensitivity of the reception as well as the strength of transmission with additional directionality.

Figure 6A:
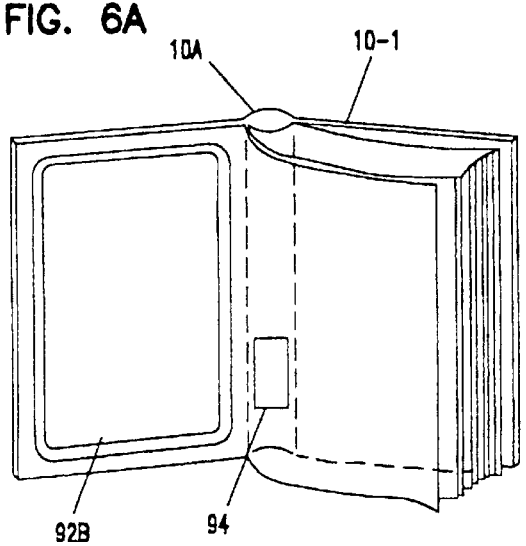
FIGS. 6A through 6D illustrate another preferred embodiment of the IC card assembly according to the current invention.
Figure 6C:
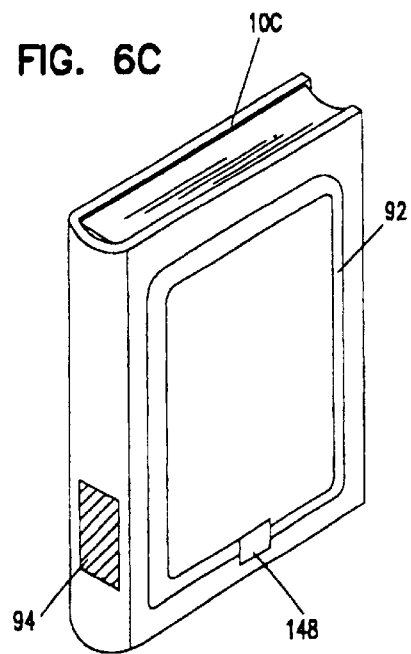
Figure 6B:
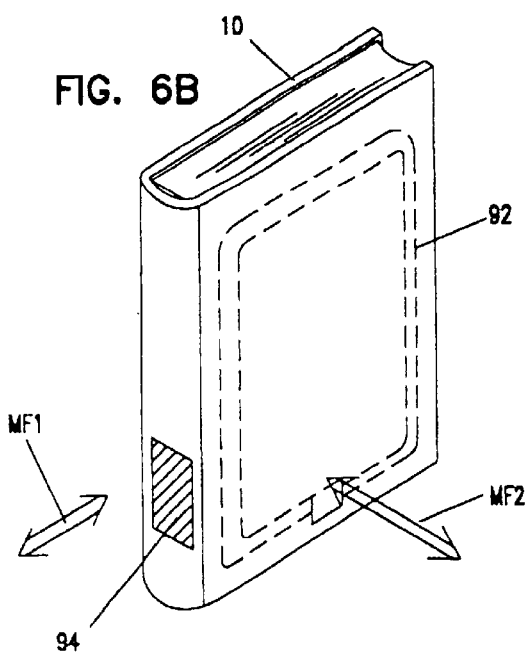

Now referring to FIGS. 6A and 6B, another preferred embodiment of the IC card assembly according to the current invention is illustrated. In particular FIG. 6A, a second preferred embodiment of the IC card assembly includes an IC card 94 placed in the back 10-1 of the book 10A and a conductive loop line 92B that is placed on an inner side of the front cover. The conductive loop line 92 is not connected to the IC card 94, but is placed sufficiently near the IC card 94. Now referring to FIG. 6B, the magnetic field directions of the above described second preferred embodiment are illustrated when the book 10A is closed. For a coil or a tag antenna of the IC card tag 94, the magnetic field direction is indicated by a double headed arrow MF1. For the conductive loop line 92, the magnetic field direction is indicated by another double headed arrow MF2. Since both the coil and the loop antenna 92 induce the magnetic field generated by a loop antenna of a reader-writer, the sensitivity of the magnetic field reception is substantially increased. Furthermore, since the coil and the loop antenna 92 have a separate magnetic field direction, they enables communication in two magnetic field directions. In the second preferred embodiment, the two magnetic field directions are perpendicular with each other, but the relative angle is not limited to 90 degrees. The pair of the tag antenna and the conductive loop line both substantially functions as an antenna, and they induce magnetic field that is perpendicular to each other.

Referring to FIG. 6C, a third preferred embodiment of the IC card assembly according to the current invention is illustrated. In addition to the above described second preferred embodiment, a capacitor 148 is connected to the conductive loop line 92. The capacitor 148 is designed to resonate with inductance of the conductive loop line 92 and or with the transmission frequency of a reader-writer so that the efficiency of the conductive loop line 92 is increased. The size of a loop in the conductive loop line 92 is determined based upon the size of the IC card tag 94 and or the size of an article on which the conductive loop line 92 is placed.

Figure 6D:
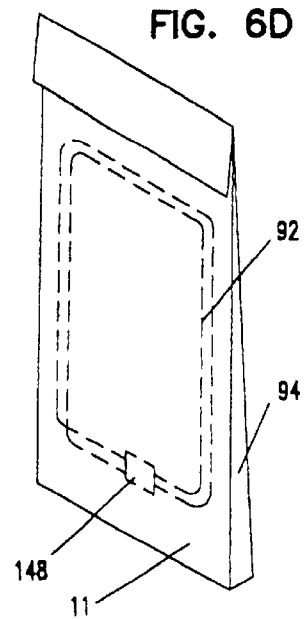

Referring to FIG. 6D, a fourth preferred embodiment of the IC card assembly according to the current invention is illustrated. The fourth preferred embodiment is essentially the same as the third preferred embodiment except that an article is now an envelope 11. The IC card tag 94 is placed on the side of the envelope 11. Other variations of the fourth preferred embodiment include cards made of paper or plastic. One type of the cards is used for recording the check out status of books. The size of a loop in the conductive loop line 92 is determined based upon the size of the IC card tag 94 and or the size of an article on which the conductive loop line 92 is placed.

Figure 7:
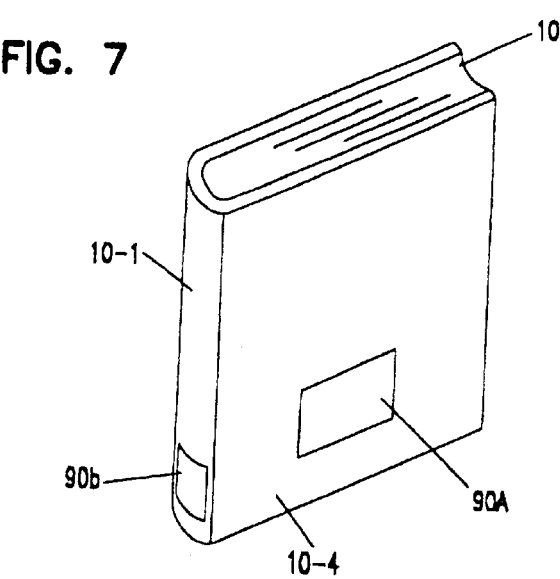
FIG. 7 illustrates a fifth preferred embodiment of the IC card assembly according to the current invention.

Referring to FIG. 7, a fifth preferred embodiment of the IC card assembly according to the current invention is illustrated. The fifth preferred embodiment includes two IC card assembly 90a and 90b, and the first IC card assembly 90a is located on a front cover 10a of a book 10 while the second IC card assembly 90a is located on a front cover 10-4. The two IC card assemblies 90a and 90b are substantially perpendicular with each other, and the corresponding coils or antennas are also positioned to be perpendicular with each other. As a result, the two coils induce the magnetic field generated by a loop antenna of a reader-writer to increase the sensitivity in the magnetic field reception.

Figure 8A:
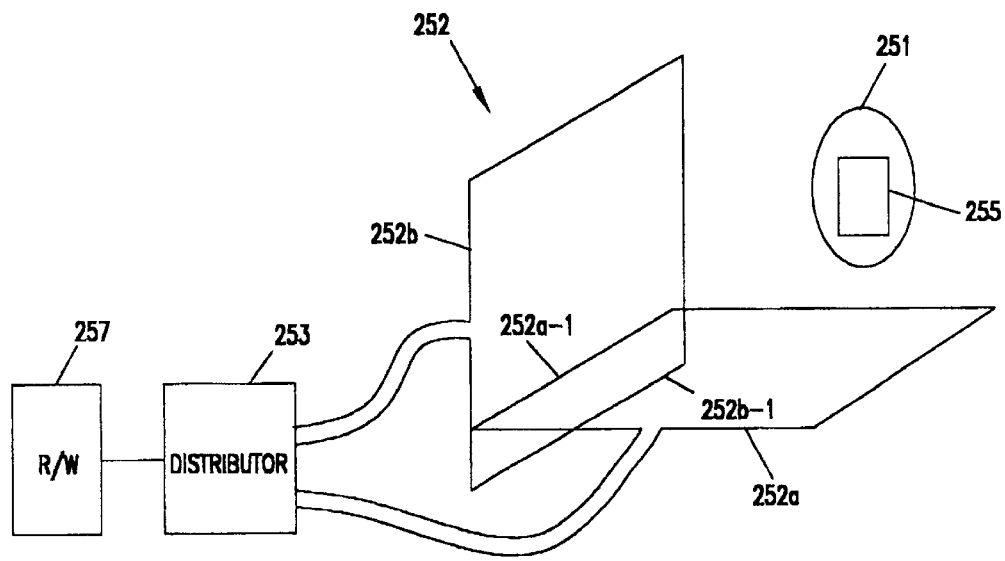
FIGS. 8A and 8B illustrate a sixth preferred embodiment of the enhanced communication between an article and a reader-writer according to the current invention.

Now referring to FIG. 8A, another approach is illustrated to increase the sensitivity in communication between an IC card tag and a reader-writer. FIG. 8A illustrates a sixth preferred embodiment of the enhanced communication between an article and a reader-writer according to the current invention that includes a pair of antennas 252a and 252b that are perpendicular with each other and placed inside the two planes, a distributor 253 for distributing current to the two antennas 252a and 252b and a reader-writer 257. The six preferred embodiment enhances the above described sensitivity by providing the two antennas 252a and 252b to generate a transmission signal. The transmission signal includes not only the current but also data and is transmitted toward an IC card tag 251. The data specifies that the transmission signal requests a reading operation for reading information already stored in an IC card 255 or a writing operation for storing new information in the IC card 255. The reader-writer 257 generates the data.

Figure 8B:
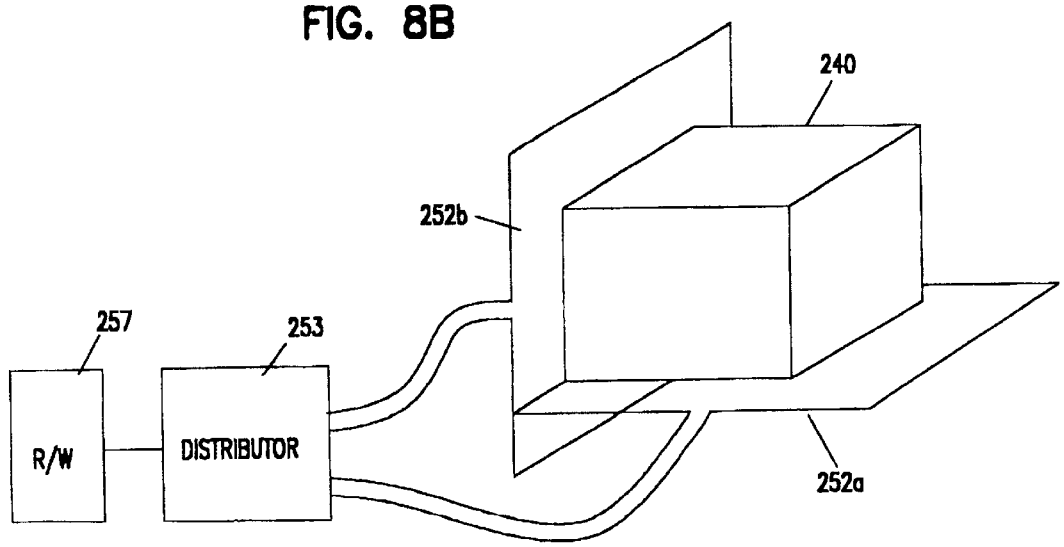

FIG. 8B illustrates a perspective view in which a box 240 is placed on or near the above described sixth preferred embodiment. The box 240 includes a plurality of items or articles, and a separate IC card tag is placed on each of these articles. For example, the articles include clothing, book and so on. Although the articles are not illustrated in the box 240, the articles do not have to be positioned at any predetermined angle with respect to the box 240. Because of the pair of the perpendicularly placed loop antennas 252a and 252b, the IC cards on the articles in the box 240 are able to communicate with the reader-writer 257 at an improved sensitivity level. The above described sixth preferred embodiment is implemented to be an exit detection device or a shelf detection device as will be further described below.

Figure 9A:
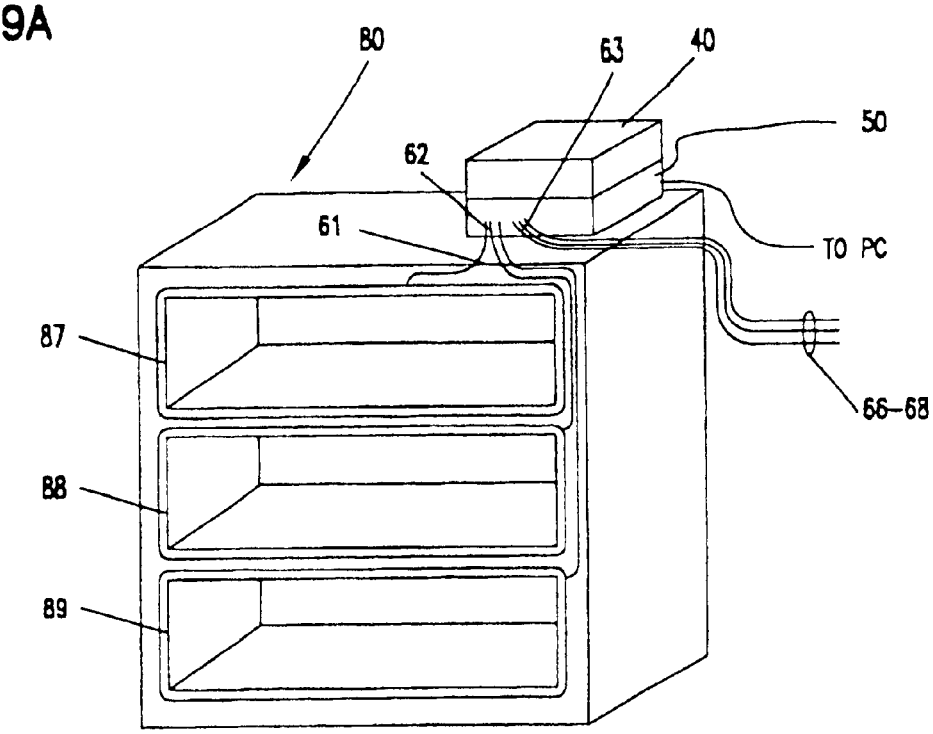
FIGS. 9A through 9C illustrate exemplary implementations of the sixth preferred embodiment according to the current invention.
Figure 9B:
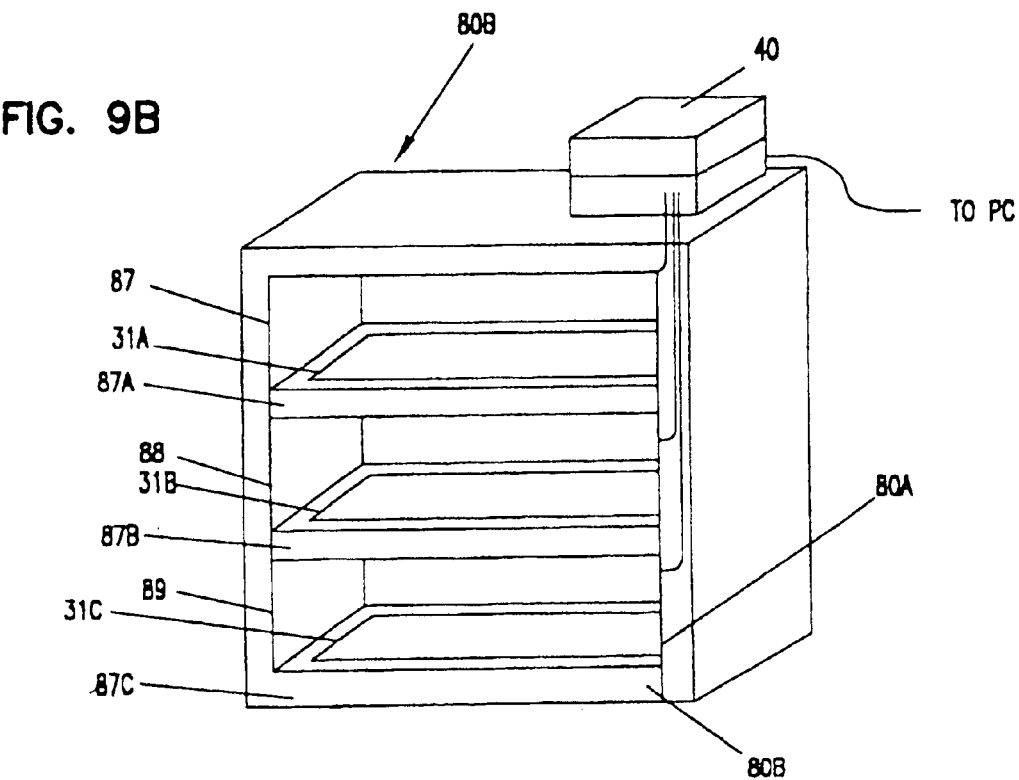
Figure 9C:
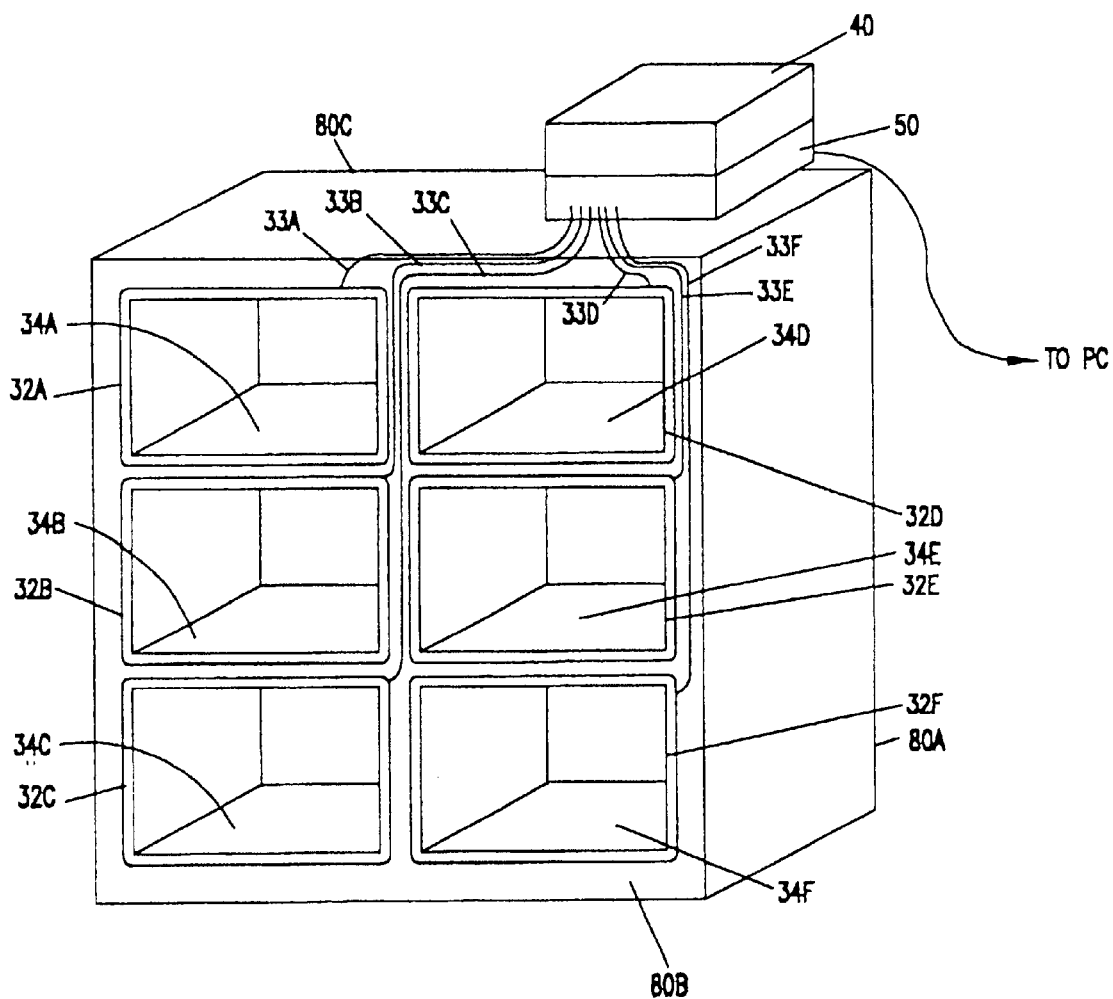

The above described sixth preferred embodiment is modified to be implemented in a variety of shelf detection devices with a non-contact id tag detection enhancing device. FIGS. 9A through 9C illustrate exemplary implementations of the sixth preferred embodiment according to the current invention. When an article with a non-contact IC card tag is placed in a storage shelf, loop antennas placed on the storage shelf communicates with the IC card tag with substantially improved sensitivity. Referring to FIG. 9A, a storage shelf 80 has three horizontal rows 87, 88 and 89. In general, each row is equipped with a separate loop of loop antenna. The rows 87, 88 and 89 are respectively wired by loop antennas 61, 62 and 63. Two vertical sides and two horizontal sides of each of the rows 87, 88 and 89 are covered by the loop antennas 61, 62 and 63. These loop antennas 61, 62 and 63 are connected to a reader-writer device 40 via an antenna switching device 50. The antenna switching device 50 selects one or more of the loop antennas 61, 62 and 63 to establish a connection with the reader-writer 40. The reader-writer 40 processes information and further transmits to the processed information to a selected loop antenna or to another processing device such as a personal computer via cables 64–66.

Referring to FIG. 9B, a storage shelf 80B has three horizontal rows 87A, 87B and 87C. In general, each row is equipped with a separate loop of loop antenna. The rows 87A, 88B and 89C are respectively wired by loop antennas 31A, 31B and 31C. One vertical side and one horizontal side of each of the rows 87A, 87B and 87C are covered by the loop antennas 31A, 31B and 31C. These loop antennas 31A, 31B and 31C are connected to a reader-writer device 40 via an antenna switching device 50. The antenna switching device 50 selects one or more of the loop antennas 31A, 31B and 31C to establish a connection with the reader-writer 40. The reader-writer 40 processes information and further transmits to the processed information to a selected loop antenna or to another processing device such as a personal computer.

Referring to FIG. 9C, a storage shelf 80C has three horizontal rows and two columns. The combination of the rows and columns creates six separate shelf areas 34A, 34B, 34C, 34D, 34E and 34F. In general, each shelf space is equipped with a separate loop of loop antenna. The shelf areas 34A, 34B, 34C, 34D, 34E and 34F are respectively wired by loop antennas 32A, 32B, 32C, 32D, 32E and 32F. Two vertical sides and two horizontal sides of each of the shelf areas 34A, 34B, 34C, 34D, 34E and 34F are covered by the loop antennas 32A, 32B, 32C, 32D, 32E and 32F. These loop antennas 32A, 32B, 32C, 32D, 32E and 32F are connected to a reader-writer device 40 via an antenna switching device 50. The antenna switching device 50 selects one or more of the loop antennas 32A, 32B, 32C, 32D, 32E and 32F to establish a connection with the reader-writer 40. The reader-writer 40 processes information and further transmits to the processed information to a selected loop antenna or to another processing device such as a personal computer.

Figure 10:
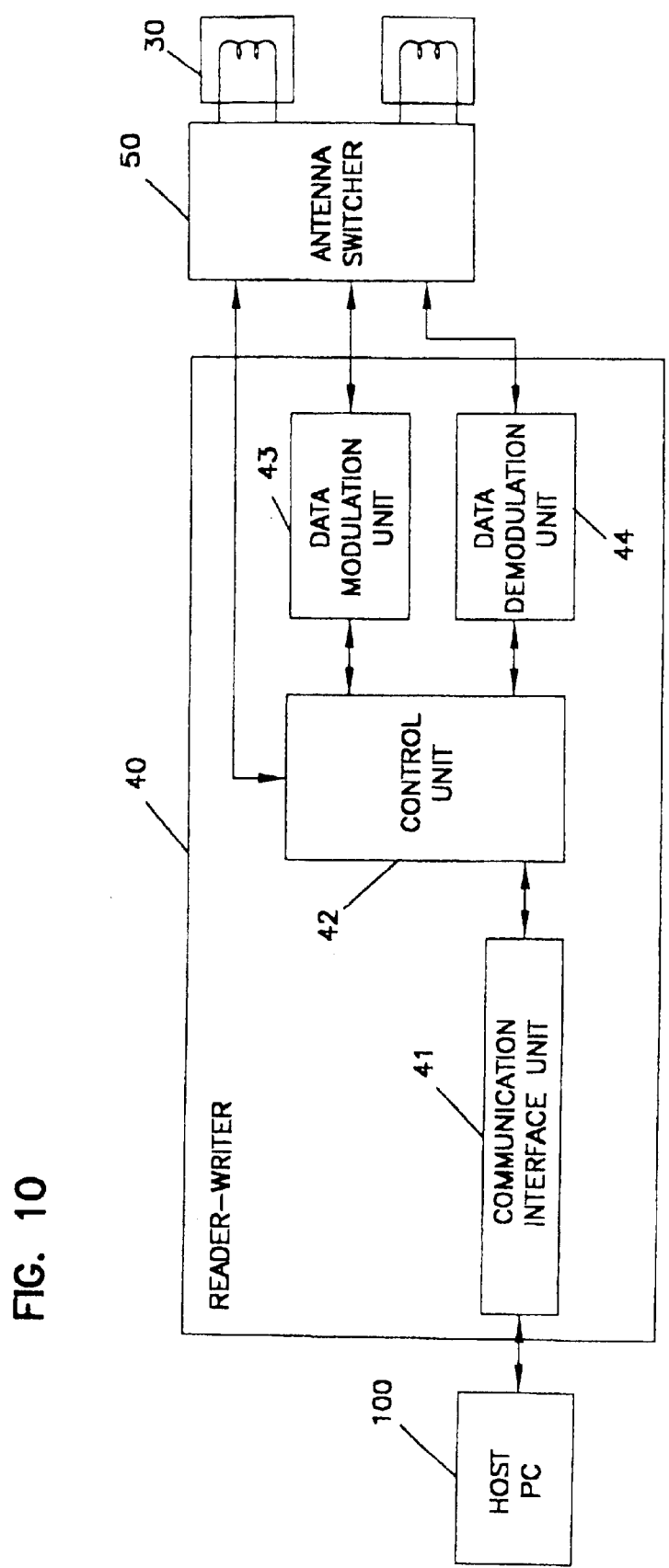
FIG. 10 is a block diagram illustrating components of the sixth preferred embodiment according the current invention.

FIG. 10 illustrate a seventh preferred embodiment of the shelf detection devices with a non-contact id tag detection enhancing device according to the current invention. In general, the seventh preferred embodiment includes a set of movable loop antennas 30, an antenna switcher 50 for selecting one or more of the antennas, a reader-writer 40 and a host computer such as a PC 100. The reader-writer 40 further includes a data modulation unit 43, a data demodulation unit 44, a communication interface unit 41 for communicating with the PC 100 and a control unit 42 for coordinating the above units. Information to and from an IC card tags is transmitted as well as received via an antenna that is selected by the antenna switcher unit 50.

Figure 11A:
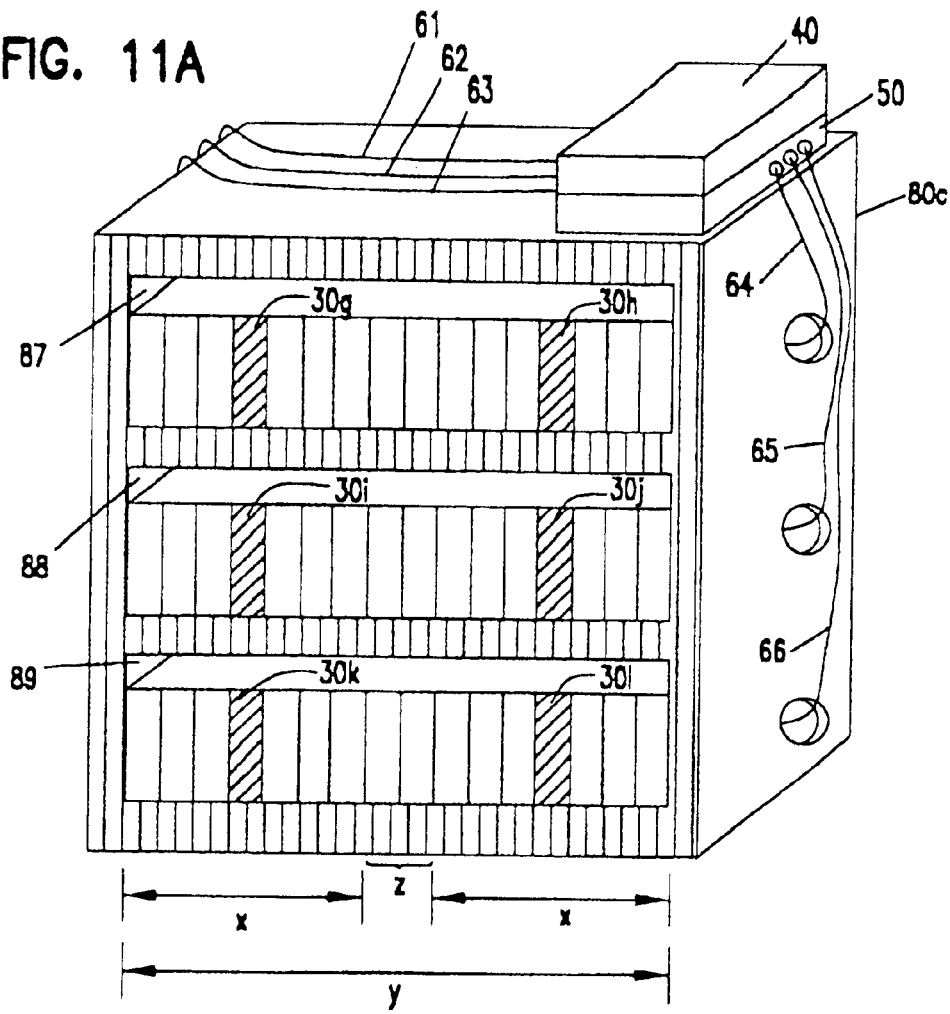
FIGS. 11A and 11D illustrate two implementations of the seventh preferred embodiment of the shelf detection devices with a non-contact id tag detection enhancing device according to the current invention.

FIGS. 11A and 11D illustrate two other implementations of the seventh preferred embodiment of the shelf detection devices with a non-contact id tag detection enhancing device according to the current invention. Referring to FIG. 11A, the shelf detection device 80C includes three rows of shelves 87, 88 and 89 and corresponding pairs of movable loop antennas 30g, 30h, 30i, 30j, 30k and 30l. Blank rectangles represent books in this example, and each book is equipped with an IC card tag for identification. The movable antennas 30g, 30h, 30i, 30j, 30k and 301 are placed anywhere on the shelf including between books or at the end against the shelf walls. These movable loop antennas 30g, 30h, 30i, 30j, 30k and 301 are connected to a reader-writer device 40 via an antenna switching device 50 and wires 64, 65 and 66. The antenna switching device 50 selects one or more of the loop antennas 30g, 30h, 30i, 30j, 30k and 301 to establish a connection with the reader-writer 40. The reader-writer 40 processes information and further transmits to the processed information to a selected loop antenna or to another processing device such as a personal computer.

Figure 11B:
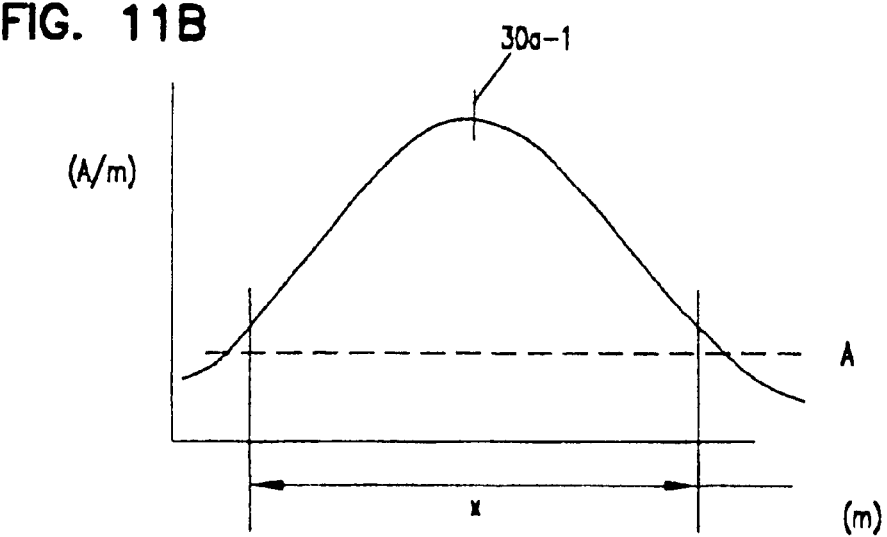
Figure 11C:
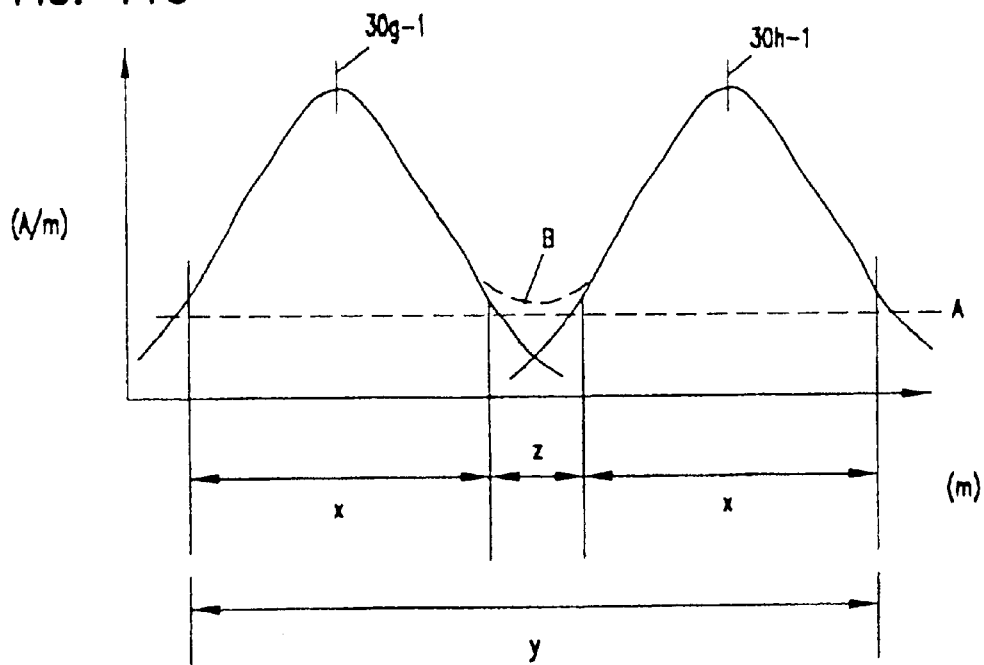

Still referring to FIG. 11A, a relative distance between a detectable range of the movable antennas 30g, 30h, 30i, 30j, 30k and 301 and the bookshelf size is described below. The width of bookshelf is y. Each of the movable loop antenna units 30g, 30h, 30i, 30j, 30k and 301 has a transmission/reception range of distance x. The width y is longer than the twice the range x. That is, y=2x+z where z is an additional distance. FIG. 11B illustrates relative magnetic field strength in A/m over the distance x in meter where the magnetic field strength is the highest near the loop antenna position 30a-1 and tapers off as the distance increases. Below a threshold level A, the magnetic field strength is not sufficient enough to detect or transmit information. FIG. 11C illustrates the magnetic field strength of two adjacent antennas as placed in the bookshelf 80c. However, because of the above distance relationship, for example, when a pair of the movable antennas 30g and 30h each having a range x is placed in a shelf having the width y, the movable loop antennas 30g and 30h are able to reach an area designated by z as the magnetic field strength is fortified with each other to form a level B and becomes above the threshold A. The cable length between the antenna switch unit 50 and the loop antennas 30g, 30h, 30i, 30j, 30k and 301 is adjusted so that the phase in the area z is synchronized. As a result of the fortification of the magnetic field, the movable loop antennas 30g, 30h, 30i, 30j, 30k and 301 are able to detect six books located in areas designated by z as shown in FIG. 11A.

FIG. 11D illustrates the other implementation of the seventh preferred embodiment of the shelf detection devices with a non-contact id tag detection enhancing device according to the current invention. The shelf detection device 80D includes three rows and two columns of shelves 81 through 86 and corresponding movable loop antennas 30a through 30f. Blank rectangles represent books in this example, and each book is equipped with an IC card tag for identification. The movable antennas 30a through 30f are placed anywhere on the shelf including between books or at the end against the shelf walls. These movable loop antennas 30a through 30f are connected to a reader-writer device 40 via an antenna switching device 50 and wires 61 through 66. The antenna switching device 50 selects one or more of the loop antennas 30a through 30f to establish a connection with the reader-writer 40. The reader-writer 40 processes information and further transmits to the processed information to a selected loop antenna or to another processing device such as a personal computer.

Still referring to FIG. 11D, the width of each bookshelf is x. Each of the movable loop antenna units 30a through 30f also has a transmission/reception range of distance x. As shown in FIG. 11B, each of the movable loop antennas 30a through 30f has the communication range of x. Thus, every shelf 81 through 86 is covered by the corresponding movable loop antenna 30a through 30f when each of the antennas is placed in the center of the shelf. In the above example, a movable loop antenna is used in a pair or by itself, but the current invention is not limited to any particular number of movable loop antennas per shelf.

Figure 12A:
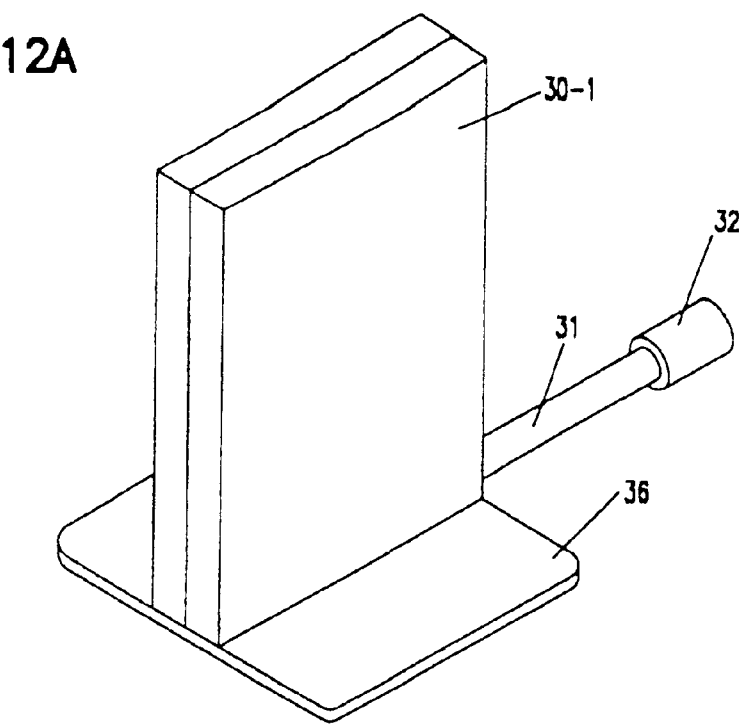
FIGS. 12A and 12B show two other exemplary implementations of the seventh preferred embodiment of the current invention.
Figure 12B:
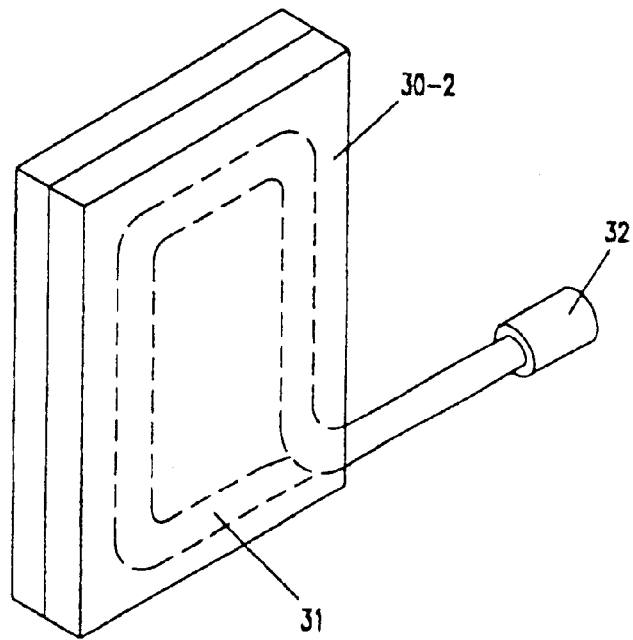

FIGS. 12A and 12B show two exemplary implementations of the seventh preferred embodiment of the current invention. FIG. 12A illustrates a bookend type of a movable loop antenna unit that includes an antenna housing 30-1 for housing an a loop antenna 31, a bottom piece 36 to support the antenna housing 30-1 in a vertical position and a connector 32 for connecting to a cable. FIG. 12B illustrates another type of a movable loop antenna unit that includes an antenna housing 30-2 for housing an a loop antenna 31 and a connector 32.

Figure 13:
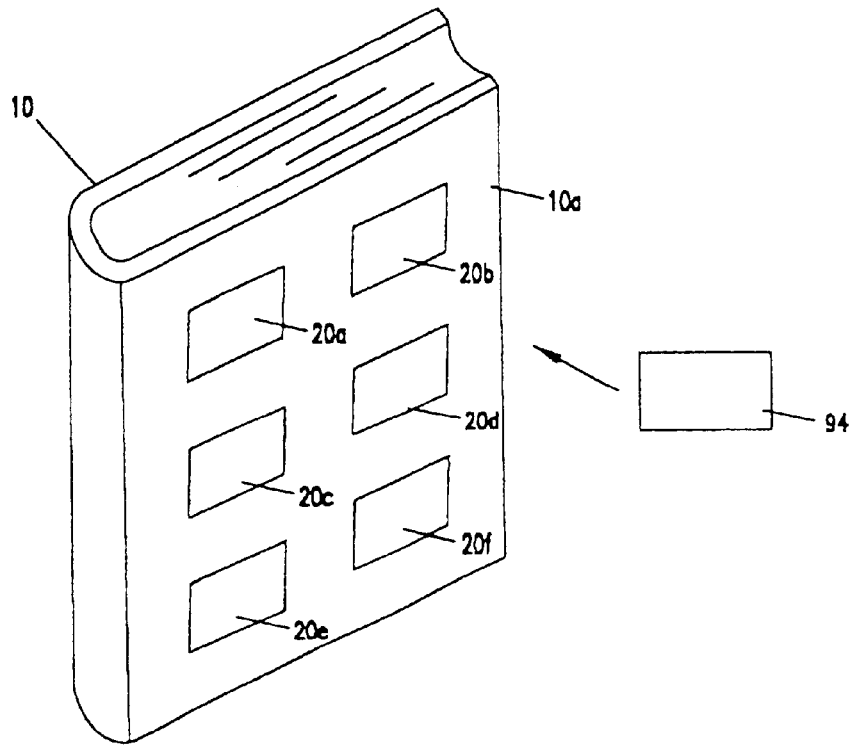
FIG. 13 illustrates exemplary placement positions of IC card tags on an article such as books.

FIG. 13 illustrates exemplary placement positions of IC card tags on an article such as books. Since the identical articles are often stacked on top of each other or side by side when they are stored on a shelf, the IC card tags are also placed on top of each other if they are placed at the same relative location on the articles. Since closely positioned IC card tags result in magnetic coupling, the loop antennas range is reduced. To avoid the range reduction of the loop antennas, the IC card tags are randomly placed at one of the six positions on the articles in this example.

Figure 14:
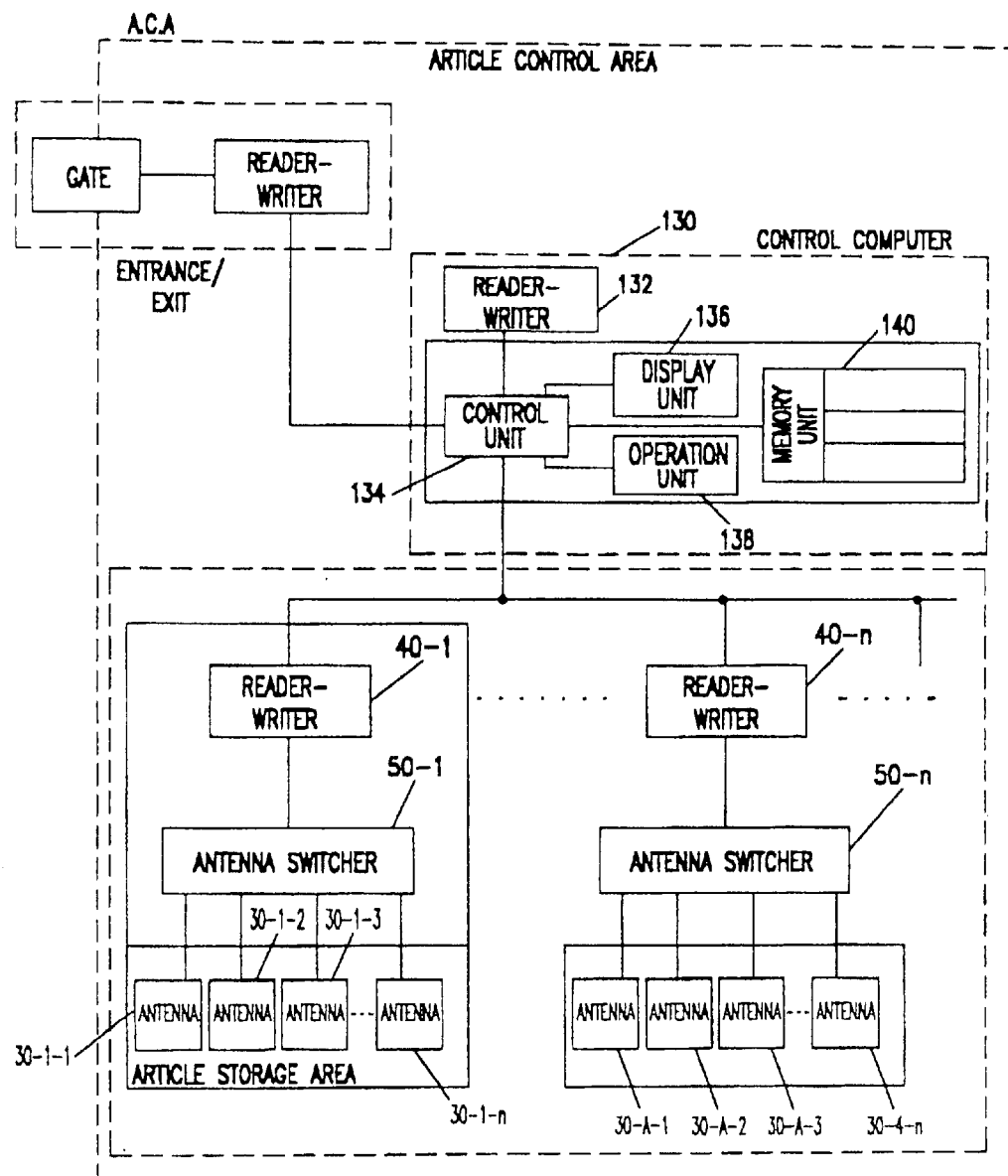
FIG. 14 is a block diagram illustrating an article management system according to the current invention.

FIG. 14 is a block diagram illustrating an article management system according to the current invention. Articles such as books to be managed in this system are each assumed to have an IC card tag. The mobile antennas 30-1-1 through 30-1-n in a first article storage area are connected to a reader-writer 40-1 via an antenna switch unit 50-1. Similarly, the mobile antennas 30-n-1 through 30-n-n in a n-th article storage area are connected to a reader-writer 40-n via an antenna switch unit 50-n. As described above, these reader-writers 40-1 through 40-n are connected to a central processing center or control computer 130. The central processing center 130 further includes a control unit 134, a display unit 136, an operation unit 138, a reader unit 132 and a memory unit 140. The control unit 134 processes the information from the reader-writers 40-1 through 40-n and also stores it in the memory unit 140. Further more, an article control management system has a predetermined article control area as indicated by dotted lines, and a gate detection unit 111 detects an exit of unauthorized articles from the predetermined article control area. The gate detection unit 11 is connected to the control unit 134 via a reader-writer 110.

FIG. 15 illustrates information store in the memory unit 140 of the central processing unit 130 as shown in FIG. 14. The information files include a book information file, a member information file and an inventory information file. Referring to FIG. 15A, the book information file includes a book ID, a book title, a publisher name, a member ID number who is currently borrowing the book, a check-out date, a return due date and an actual returned date. Referring to FIG. 15B, a member information file includes a member ID, a member name, an address of the member, a telephone number, a driver license ID number and a currently borrowing book title. Lastly, referring to FIG. 15C, an inventory information file includes a shelf stack number, a book ID number, a book title, a borrowing member ID, a due date, wrongly stacked and lost info.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of keeping track of a plurality of articles in a predetermined area, comprising:

placing a non-contact id tag on one surface of each of the articles to be monitored by RF detection, the non-contact id tag containing information;

placing a sensing portion of a non-contact id tag reader-writer at a predetermined location within the predetermined area;

placing a non-contact id tag detection enhancing device separately placed on another surface of the articles at a predetermined angle with respect to the non-contact id tag without connection to the non-contact id tag so as to increase the RF detection of the non-contact id tag by the non-contact id reader-writer; and detecting the non-contact id tag near the non-contact id reader-writer in the predetermined area.

2. The method of keeping track of a plurality of articles according to claim 1 further comprising:

reading the information from the non-contact id tag; and writing additional information in the non-contact id tag.

3. The method of keeping track of a plurality of articles according to claim 2 wherein the articles are books and the information includes a check-out status, a due date and a borrower of the books.

4. The method of keeping track of a plurality of articles according to claim 2 wherein the articles are books and the information includes a shelf position of the books.

5. The method of keeping track of a plurality of articles according to claim 2 wherein the articles are goods and the information includes inventory information.

6. The method of keeping track of a plurality of articles according to claim 1 further comprising:

reading the information from the non-contact id tag of a first article; and generating an alarming signal based upon the read information.

7. The method of keeping track of a plurality of articles according to claim 6 wherein the alarm signal is generated when the first article is taken out from the predetermined area without proper authorization.

8. The method of keeping track of a plurality of articles according to claim 6 wherein the alarm signal is generated when the first article is placed at a location other than the predetermined location within the predetermined area.

9. The method of keeping track of a plurality of articles according to claim 1 wherein the non-contact id tag detection enhancing device has a first magnetic field direction, the non-contact id tag having a second magnetic direction, the non-contact id tag detection enhancing device is placed on each of the article so that the first magnetic field direction is perpendicular to the second magnetic field direction.

10. The method of keeping track of a plurality of articles according to claim 1 wherein the non-contact id tag detection enhancing device is a loop antenna having a first magnetic field direction and connected to the non-contact id reader-writer, the sensing portion having a second magnetic field direction, the first magnetic field direction is perpendicular to the second magnetic field direction.

11. The method of keeping track of a plurality of articles according to claim 1 further comprising:

placing the sensing portion of the non-contact id tag reader-writer near each of subdivided areas of the predetermined area;

placing a corresponding one of the non-contact id tag detection enhancing device; and switching among the sensing portions of the non-contact id tag reader-writer.

12. A system for keeping track of a plurality of articles in a predetermined area, comprising:

a non-contact id tag placed on one surface of each of the articles to be monitored by RF detection, the non-contact id tag containing information;

a non-contact id tag reader-writer located near the predetermined area, said non-contact reader-writer having a sensing portion for detecting the non-contact id tag placed near the non-contact id reader-writer; and a non-contact id tag detection enhancing device also separately placed on another surface of the articles at a predetermined angle with respect to the non-contact id tag without connection to the non-contact id tag so as to increase the RF detection of the non-contact id tag by the non-contact id reader-writer.

13. The system for keeping track of a plurality of articles according to claim 12 wherein said non-contact id tag is an IC card tag having a memory for storing the information.

14. The system for keeping track of a plurality of articles according to claim 12 wherein said non-contact id tab reader-writer reads the information from the non-contact id tag as well as writes additional information in the non-contact id tag.

15. The system for keeping track of a plurality of articles according to claim 14 wherein the articles are books, said non-contact id tag reader-writer reading and writing the information on a check-out status, a due date and a borrower of the books.

16. The system for keeping track of a plurality of articles according to claim 14 wherein the articles are books, said non-contact id tag reader-writer reading and writing the information on a shelf position of the books.

17. The system for keeping track of a plurality of articles according to claim 14 wherein the articles are goods, said non-contact id tag reader-writer reading and writing the information on inventory.

18. The system for keeping track of a plurality of articles according to claim 12 wherein said non-contact id tag reader-writer reads the information from the non-contact id tag and generates an alarming signal based upon the read information.

19. The system for keeping track of a plurality of articles according to claim 12 wherein the non-contact id tag detection enhancing device is a loop conductive line having a first magnetic field direction, said non-contact id tag having a second magnetic field direction, the first magnetic field direction on each of the article being perpendicular to the second magnetic field direction.

20. The system for keeping track of a plurality of articles according to claim 12 wherein the non-contact id tag detection enhancing device is a loop antenna connected to said non-contact id reader-writer and having a first magnetic field direction, said sensing portion having a second magnetic field direction, the first magnetic field direction being perpendicular to the second magnetic field direction.

21. The system for keeping track of a plurality of articles according to claim 12 further comprising:

a plurality of said non-contact id tag reader-writers placed near each of subdivided areas of the predetermined area; and a plurality of said non-contact id tag detection enhancing devices corresponding to each of said non-contact id tag reader-writers; and a switch for switching among the sensing portions of the non-contact id tag reader-writer.

22. The system for keeping track of a plurality of articles according to claim 21 further comprising:

a central processing unit connected to said plurality of said non-contact id tag reader-writers and said switch for reading the information from said non-contact id tag reader-writers in a coordinated manner; and a storage unit connected to said central processing unit for storing the read information.

23. A non-contact id tag module, comprising:

an IC card tag placed on one surface of an article having a memory unit for storing information, a control unit connected to said memory unit for reading and writing the information, a resonance circuit for resonating an RF signal, a power generating unit connected to the resonance circuit for generating power from the RF signal, and a data demodulation unit and a data modulation unit connected to said control unit for respectively modulating and demodulating the information to generate the RF signal; and a loop conductive line separately placed on another surface of the article at a predetermined angle with respect to said IC card tag without connection to said IC card tag without connection to said IC card tag for enhancing reception and transmission of the RF signal.

24. The non-contact id tag module according to claim 23 wherein said loop conductive line forms a first magnetic field direction that is perpendicular to a second magnetic field direction formed by the resonance circuit.

25. The non-contact id tag module according to claim 23 wherein said loop conductive line is connected to a capacitor.

26. A storage shelf unit for detecting a non-contact id tag on articles, comprising:

a plurality of shelves;

a plurality of movable loop antennas placed on said shelves for transmitting signals to and receiving signals from the non-contact id tag, a first one of said plurality of said movable loop antennas having a first magnetic field direction and a second one of said plurality of said movable loop antennas having a second magnetic field direction that is substantially perpendicular to the first magnetic field direction;

an antenna switcher connected to said movable loop antennas for switching from one of said movable loop antennas to another one of said movable loop antennas;

a data modulator/demodulator connected to said antenna switcher for modulating and demodulating the signals;

a processing unit connected to said data modulator/demodulator for processing the signals; and a communication interface connected to said processing unit for providing an interface in transmitting the processed signals and in receiving other signals from an outside unit.

27. The storage shelf unit for detecting a non-contact id tag according to claim 26 wherein each of said movable loop antennas is a part of a movable bookend.

28. The storage shelf unit for detecting a non-contact id tag according to claim 27 wherein said movable bookend comprises a first one of said loop antennas having a first magnetic field direction and a second one of said loop antennas having a second magnetic field direction that is perpendicular to the first magnetic field direction.

29. A storage shelf unit for detecting a non-contact id tag on articles, comprising:

a plurality of shelves;

a plurality of pairs of loop antennas placed on said shelves for transmitting signals to and receiving signals from the non-contact id tag, each of said pairs of said loop antennas having magnetic field directions that are perpendicular to each other;

an antenna switcher connected to said loop antennas for switching from one of said pairs of said loop antennas to another one of said pairs of said loop antennas;

a data modulator/demodulator connected to said antenna switcher for modulating and demodulating the signals;

a processing unit connected to said data modulator/demodulator for processing the signals; and a communication interface connected to said processing unit for providing an interface in transmitting the processed signals and in receiving other signals from an outside unit.

30. An exit monitor device for detecting a non-contact id tag on articles, comprising:

a plurality of pairs of loop antennas placed near an exit for transmitting signals to and receiving signals from the non-contact id tag, each of said pairs of said loop antennas having magnetic field directions that are perpendicular to each other;

an antenna switcher connected to said loop antennas for switching from one of said pairs of said loop antennas to another one of said pairs of said loop antennas;

a data modulator/demodulator connected to said antenna switcher for modulating and demodulating the signals;

a processing unit connected to said data modulator/demodulator for processing the signals; and a communication interface connected to said processing unit for providing an interface in transmitting the processed signals and in receiving other signals from an outside unit.

* * * * *